United States Patent
Repentin et al.

(10) Patent No.: US 12,228,040 B2
(45) Date of Patent: Feb. 18, 2025

(54) EXPANSION INSTALLATION AND INSTALLATION FOR OBTAINING ELECTRICAL ENERGY FROM HEAT

(71) Applicant: BITZER Kuehlmaschinenbau GmbH, Sindelfingen (DE)

(72) Inventors: Franck Repentin, Herrenberg (DE); Marcus Blumhardt, Rutesheim (DE)

(73) Assignee: BITZER Kuehlmaschinenbau GmbH, Sindelfingen (DE)

(*) Notice: Subject to any disclaimer, the term of this patent is extended or adjusted under 35 U.S.C. 154(b) by 637 days.

(21) Appl. No.: 17/392,476

(22) Filed: Aug. 3, 2021

(65) Prior Publication Data
US 2021/0363919 A1 Nov. 25, 2021

Related U.S. Application Data

(63) Continuation of application No. PCT/EP2020/052314, filed on Jan. 30, 2020.

(30) Foreign Application Priority Data
Feb. 5, 2019 (DE) .......................... 102019102819.1

(51) Int. Cl.
*F01D 25/00* (2006.01)
*G01P 3/48* (2006.01)

(52) U.S. Cl.
CPC ................ *F01D 25/00* (2013.01); *G01P 3/48* (2013.01); *F05D 2220/64* (2013.01); (Continued)

(58) Field of Classification Search
CPC ......................... F05D 2220/76; F05D 2270/304
See application file for complete search history.

(56) References Cited

U.S. PATENT DOCUMENTS 3,709,626 A * 1/1973 Eggenberger ............ G05B 9/03
  700/289
4,259,835 A * 4/1981 Reed ......................... F02C 9/28
  60/39.281
(Continued)

FOREIGN PATENT DOCUMENTS

DE 1770399 U 7/1958
DE 2243830 A1 3/1973
(Continued)

OTHER PUBLICATIONS

Machine translation of DE112013006890T5, accessed Jan. 10, 2024. (Year: 2024).*
(Continued)

*Primary Examiner* — Jonathan R Matthias
(74) *Attorney, Agent, or Firm* — Reinhart Boerner Van Deuren P.C.

(57) ABSTRACT

In order to improve an expansion installation for obtaining electrical energy from heat by means of a thermodynamic circulation procedure, comprising an expansion device, which is operated by an expanding working medium of the thermodynamic circulation procedure, and a generator driven by the expansion device, it is proposed that the expansion installation should be provided with a rotational speed sensor, which is coupled to a shaft of the expansion installation that rotates proportionally to a rotor of the generator, and which takes the form of an electrical sensor generator that generates an electrical sensor signal.

43 Claims, 11 Drawing Sheets

(52) U.S. Cl.
CPC .... *F05D 2220/76* (2013.01); *F05D 2270/304* (2013.01); *Y02E 10/44* (2013.01)

(56) References Cited

U.S. PATENT DOCUMENTS

| | | | |
|---|---|---|---|
| 4,291,547 | A | 9/1981 | Leo |
| 4,915,514 | A | 4/1990 | Söderlund |
| 5,246,357 | A | 9/1993 | Sjoholm et al. |
| 5,411,388 | A | 5/1995 | Söderlund |
| 6,048,101 | A | 4/2000 | Rasmussen |
| 2002/0037229 | A1 | 3/2002 | Sjoholm et al. |
| 2004/0170512 | A1 | 9/2004 | Yannascoli et al. |
| 2010/0034684 | A1* | 2/2010 | Ast ............ F01K 25/06 418/98 |
| 2010/0308805 | A1* | 12/2010 | Stuve ............ G01D 5/145 324/207.24 |
| 2013/0108495 | A1 | 5/2013 | Bakkestuen et al. |
| 2016/0097572 | A1 | 4/2016 | Feller et al. |
| 2016/0130970 | A1* | 5/2016 | Blazer ............ H02P 25/03 290/7 |
| 2016/0312782 | A1 | 10/2016 | Shoulders |

FOREIGN PATENT DOCUMENTS

| | | |
|---|---|---|
| DE | 3708200 A1 | 10/1988 |
| DE | 2844940 C2 | 1/1990 |
| DE | 102009038937 A1 | 3/2011 |
| DE | 102013002049 A1 | 8/2014 |
| DE | 112013006890 T5 | 12/2015 |
| DE | 102016216720 A1 | 3/2018 |
| EP | 2161417 A1 | 3/2010 |
| FR | 2976136 A1 | 12/2012 |
| GB | 2006343 B | 2/1982 |
| JP | S57135986 A | 9/1982 |
| JP | S57153986 A | 9/1982 |
| JP | S62195481 A | 8/1987 |
| JP | 2004340014 A | 12/2004 |
| JP | 2016007113 A | 1/2016 |
| WO | WO 2004/005939 A1 | 1/2004 |
| WO | WO 2014121894 A1 | 8/2014 |
| WO | WWO 2016099746 A1 | 6/2016 |

OTHER PUBLICATIONS

Machine translation of DE1770399U, accessed Jan. 10, 2024. (Year: 2024).*

Machine translation of FR2976136A1, accessed Jan. 10, 2024. (Year: 2024).*

U.S. Appl. No. 17/392,470, filed Aug. 3, 2021, Repentin et al.

* cited by examiner

EXPANSION INSTALLATION AND INSTALLATION FOR OBTAINING ELECTRICAL ENERGY FROM HEAT

CROSS-REFERENCE TO RELATED PATENT APPLICATIONS

This application is a continuation of International application number PCT/EP2020/052314 filed on Jan. 30, 2020.

This patent application claims the benefit of International application No. PCT/EP2020/052314 of Jan. 30, 2020 and German application No. 10 2019 102 819.1, filed Feb. 5, 2019, the teachings and disclosure of which are hereby incorporated in their entirety by reference thereto.

BACKGROUND OF THE INVENTION

The invention relates to an expansion installation for obtaining electrical energy by means of a thermodynamic circulation procedure, comprising an expansion device, which is operated by an expanding working medium of the thermodynamic circulation procedure, and a generator driven by the expansion device.

Expansion installations of this kind have the problem of detecting the speed of rotation of the generator as precisely as possible, since the frequency of the AC voltage generated by the generator is dependent on the speed of the generator, and feeding electrical energy into a grid is only useful if the frequency of the AC voltage generated by the generator matches the grid frequency of the grid.

SUMMARY OF THE INVENTION

This object is achieved according to the invention with an expansion installation of the type mentioned in the introduction in that the expansion installation is provided with a rotational speed sensor, which is coupled to a shaft of the expansion installation that rotates proportionally to a rotor of the generator, and which takes the form of an electrical sensor generator that generates an electrical sensor signal.

The advantage of the solution according to the invention can be seen in the fact that a sensor generator is a simple component that can be coupled to any shaft of the expansion installation that rotates proportionally to the rotor of the generator in order to generate as a sensor signal an electrical voltage permitting the speed of the rotor of the generator to be inferred.

In principle, as the electrical sensor signal either a current or a voltage may be evaluated.

However, evaluation of a current is more complex since it has to flow through a load and is thus no longer proportional to the speed of rotation of the generator.

For this reason, it is particularly advantageous if, as the electrical sensor signal, a voltage signal is generated that can be detected by a direct voltage measurement and is substantially proportional to the speed of rotation of the generator.

Here, a voltage of this kind can be detected in particular in the absence of a significant flow of current and thus without more complex circuitry.

Particularly advantageously, the solution according to the invention can be achieved if the sensor generator is arranged in an overall casing of the expansion installation and is exposed in particular therein to the working medium and/or lubricant.

This solution has the great advantage that the sensor generator may be integrated into the expansion installation in a simple manner, and moreover has the advantage that, in the integration of the sensor generator, there is no need to take any measures in order to protect it from lubricant and/or the working medium of the circulation procedure.

A further advantageous solution provides for the sensor generator to have a permanently magnetized sensor rotor that cooperates with a stator having stator windings, wherein, during rotation of the sensor rotor, there is produced at the stator windings of the stator a voltage that is dependent on the speed of the sensor rotor and represents the sensor signal.

This solution is advantageous in particular because the permanent magnetization of the sensor rotor makes the voltage produced in the stator windings substantially proportional, in particular proportional, to the speed of the sensor rotor, with the result that the sensor signal allows the speed of the sensor rotor and thus also the speed of the rotor of the generator for generating electrical energy to be inferred in a simple manner.

Further, it is advantageous if, for the purpose of achieving the permanent magnetization, the sensor rotor has a magnet material comprising rare earth elements, since a magnet material of this kind opens up the possibility of ensuring a high level of permanent magnetization of the sensor rotor.

It is particularly advantageous if the sensor generator is configured such that, at a speed of rotation of the generator that gives a frequency of the generated AC voltage lying in the range of a grid frequency of a grid that receives the electrical energy, it generates a voltage in the range between 30 V and 48 V, preferably between 40 V and 48 V.

This solution has the great advantage that generating as high a voltage as possible by means of the sensor generator in the speed range that is relevant for evaluation of the speed of rotation of the generator for generating electrical energy improves the accuracy of detection of the speed without the need to use electrical components that have to be suitable for voltages above 48 V, so the sensor generator and the evaluation electronics equipment may be in the form of low-cost components.

As regards installation of the sensor rotor of the sensor generator, the most diverse possibilities are conceivable.

For example, it would be conceivable to couple the sensor rotor to a shaft of the expansion installation by way of a transmission.

A particularly simple solution provides for the sensor rotor of the sensor generator to be coupled directly and non-rotatably to a shaft end and to be carried by it.

This simplifies installation of the sensor generator considerably, since there is no need for any bearing for the sensor rotor, but rather the sensor rotor of the sensor generator is mounted by way of the shaft end.

A particularly favorable solution provides for the sensor rotor to be arranged on a rotor carrier that is connected to the shaft end.

So that the rotor carrier can be mounted in a simple manner, it has proved particularly favorable if the rotor carrier is connected to the shaft end by means of a centering screw.

In order further to improve the precision of centering of the rotor carrier in relation to the shaft end, it has proved advantageous if the rotor carrier is centered in relation to the shaft end by means of a centering cone, since a centering cone of this kind opens up the possibility of improving centering of the sensor rotor in relation to the shaft end and in particular compensating for thread play.

Further, it has proved advantageous if the shaft end that is coupled to and carries the sensor rotor is guided in centered manner by a bearing such that the shaft end itself likewise moves with, and transmits to the sensor rotor, only negligible centering errors.

For this purpose, it is particularly advantageous if the shaft end is at a spacing from the bearing that guides it in centered manner at most by an amount that corresponds to a diameter of the shaft end.

Centering the sensor rotor, in relation to the axis about which it rotates, as precisely as possible is advantageous because this enables a small gap to be achieved between the sensor rotor and the stator, which is in turn required for generating a sensor signal that is as precise as possible.

In the context of the description above of the possible ways to install the sensor generator in the expansion installation, only the fact that the sensor generator should rotate at a proportionally to the rotor of the generator generating electrical energy was specified.

An advantageous solution provides for the sensor generator to be arranged in an overall casing of the expansion installation.

This solution has the advantage that as a result the sensor generator can be protected in a simple manner and in that case moreover can also be arranged in a manner directly coupled to the shaft driving it, so there is no need for a feedthrough for the shaft through the overall casing.

Within the overall casing, the sensor generator can then still be arranged in different casing parts thereof.

For example, it is conceivable to arrange the sensor generator in an expander casing.

In this case, it is preferably provided for the sensor generator to be coupled to a screw shaft.

A particularly simple and advantageous solution provides for the sensor generator to be arranged in a generator casing.

It is in particular advantageous if the sensor generator is coupled to a generator shaft of the generator generating electrical energy, such that it can directly detect the speed of the generator shaft.

A particularly favorable solution provides for the sensor rotor of the sensor generator to be coupled to a shaft end of the generator shaft and carried by it.

More detailed statements have not yet been made as regards the installation of the stator of the sensor generator.

For example, an advantageous solution provides for the stator of the sensor generator to be held stationary on a projection of an overall casing of the expansion installation.

In order to arrange the stator of the sensor generator in a manner that is as easy as possible to maintain and where appropriate also easy to retrofit, it is preferably provided for the stator of the sensor generator to be held on a casing element, in particular a casing element that is demountable from the overall casing.

In this way, it is possible to perform maintenance in a particularly simple manner and where appropriate also to retrofit the sensor generator in a simple manner.

So that the sensor signal can be directed in a simple manner to a controller for the expansion installation, it is preferably provided for the casing element to be provided with an electrical terminal feedthrough such that the sensor signal can be directed out of the overall casing in a simple manner.

This means that for example the stator can be arranged stationary on a projection of a generator casing or on a projection of an expander casing or a bearing casing.

More detailed statements have not been made in conjunction with the description above of the individual exemplary embodiments as regards the form taken by the expansion device.

For example, an advantageous solution provides for the expansion device to have at least one expander screw, which is driven by the expanding working medium and drives the generator.

Moreover, the invention relates to an installation for obtaining electrical energy from heat, in particular industrial waste heat, comprising an expansion installation that is operated in a thermodynamic circulation procedure and advantageously has one or more of the features described above.

In order, in the case of the installation according to the invention, to operate the generator such that the electrical energy it generates is fed to an electrical grid in optimum manner, there is preferably provided a controller, which controls a circuit of the circulation procedure and a power switch for connecting the generator to an electrical grid, wherein the controller is thus able to operate the expansion installation and thus the generator such that the electrical energy is fed to the electrical grid in optimum manner.

In particular, the controller takes a form such that it detects the voltage generated by the sensor generator, determines therefrom a value of the speed of the generator and, by closing the power switch, connects the generator to the electrical grid when the speed of the generator gives an AC voltage of which the frequency corresponds substantially to a grid frequency of the electrical grid.

This ensures that the controller only makes a connection between the generator and the electrical grid when optimum feeding of the generated electrical energy to the grid is ensured.

Further, it is preferably provided for the controller to control the circuit of the circulation procedure such that, once the connection has been made with the grid, the generator converts the heat made available to the thermodynamic circulation procedure to electrical energy with the greatest possible efficiency and feeds this electrical energy to the grid.

Moreover, for safety reasons it is provided for the controller to monitor the speed of rotation of the generator that is coupled to the grid and, if the frequency of the generated AC voltage deviates from the grid frequency, to intervene in the circuit in controlling manner, adapting the speed of the generator.

A further advantageous solution provides for the controller to monitor the speed of rotation of the generator that is coupled to the grid and, if the difference between the frequency of the AC voltage generated by the generator and the grid frequency of the grid exceeds a threshold, to isolate the generator from the electrical grid by opening the power switch, with the result that, in every possible condition of the circulation procedure, it is ensured that there can be no disruptive influences on the grid.

A further advantageous embodiment provides for the controller, when the generator is connected to the grid, to connect stator windings of the generator to a capacitor set in parallel.

A capacitor set of this kind makes it possible to achieve optimum power adaptation, as regards reactive and active power, when there is a connection between the generator and the grid.

In particular here, the capacitor set takes a form such that its capacitors are each connected to the stator windings of the generator in parallel.

In order, when the generator is isolated, to decelerate the speed of rotation of the generator, a further advantageous solution provides for the controller, when the generator is isolated from the grid, to maintain the parallel connection of the stator windings to the capacitor set and in addition to connect a resistor set to it in parallel.

Here, a resistor set of this kind takes a form in particular such that individual resistors thereof are each connected in parallel to the stator windings and to the capacitors that are connected in parallel in order to receive the current that is generated by the generator in connection with the capacitor set and at the same time to decelerate the speed of the generator.

In order further to ensure that, in conjunction with start-up of the circuit of the circulation procedure, the generator starts up simply and as easily as possible, a further advantageous embodiment of the solution according to the invention provides for the controller to isolate the generator from the capacitor set and the resistor set for the purpose of generator start-up, so that the generator can itself start up independently and without being adversely affected by the generator set and the resistor set.

In a further exemplary embodiment of an installation according to the invention, it is preferably provided for the generator to be coupled to the electrical grid by means of a converter unit.

A converter unit of this kind provides the possibility of operating the generator such that it generates electrical energy having a generator frequency that need not necessarily match the grid frequency of the grid in order for this electrical energy to be fed to the grid at the grid frequency.

This means that in particular the circulation procedure in which the expansion installation is arranged and operated can be utilized for feeding electrical energy to the grid in an even more optimum manner.

Further, the converter unit provides the possibility of making the connection between the generator and the grid substantially without any occurrence of voltage peaks.

In particular here, it is provided for the converter unit to convert the electrical energy that is generated by the generator at a generator frequency into electrical energy having the grid frequency of the grid, and to feed it to the grid.

Preferably here, it is provided for the converter unit to convert the electrical energy of the generator into electrical energy for feeding to the grid if the generator frequency of the electrical energy lies in an operating frequency range of the converter unit that extends from a minimum frequency to a maximum frequency.

This means that with this solution the converter unit is only used if the generator frequency lies within the operating range, and thus the converter unit only converts the electrical energy generated by the generator if it lies within the operating frequency range, which is selected such that useful and effective conversion of the electrical energy generated by the generator into electrical energy at grid frequency is possible.

Preferably here, the minimum frequency lies in the range from 30 to 40 Hz and the maximum frequency lies in the range from 60 to 80 Hz.

So that the generator can be operated stably, it is preferably provided for the converter unit to be configured to predetermine the generator frequency of the generator—that is to say that the generator is kept at a particular generator frequency that ensures useful and efficient operation of the converter unit without any risk of the generator operating unstably in respect of its generator frequency and thus the generator frequency varying as a result of fluctuations in operation in the circulation procedure.

Further, it is particularly favorable if, as a result of cooperation between the controller and the converter unit, the generator frequency is adaptable to the output released by the circulation procedure at the generator.

This means that the controller provides the possibility that the controller keeps the generator frequency at a stable value that in particular lies within the operating frequency range.

Further, for safety reasons it is provided for the controller to uncouple the generator from the converter unit if the generator frequency lies outside the operating range.

A further advantageous solution provides for the converter unit to have a DC link circuit and a second converter, fed by this, for generating electrical energy at the grid frequency.

Here, in principle the DC link circuit could be fed from the generator by way of a rectifier unit.

However, it is particularly favorable if the converter unit has a first converter, which is connectable to the generator, for feeding the DC link circuit, since a first converter of this kind on the one hand provides the possibility of efficiently converting the electrical energy produced at the generator frequency into the DC link circuit, and on the other provides the possibility of keeping the generator at the generator frequency, where appropriate while temporarily feeding electrical energy to the generator in order to keep it at a defined generator frequency.

Thus, the description above of solutions according to the invention comprises in particular the different combinations of features that are defined by the sequentially numbered embodiments below:

1. An expansion installation (30) for obtaining electrical energy from heat by means of a thermodynamic circulation procedure, comprising an expansion device (32), which is operated by an expanding working medium of the thermodynamic circulation procedure, and a generator (34) driven by the expansion device (32), wherein the expansion installation (30) is provided with a rotational speed sensor (120), which is coupled to a shaft (98, 56, 58) of the expansion installation (30) that rotates proportionally to a rotor (82) of the generator (34), and which takes the form of an electrical sensor generator (122) that generates an electrical sensor signal.

2. The expansion installation according to embodiment 1, wherein as a sensor signal the electrical sensor generator (122) generates an electrical voltage.

3. The expansion installation according to embodiment 1 or 2, wherein the sensor generator (122) is arranged in an overall casing of the expansion installation (30) and is exposed in particular therein to the working medium and/or lubricant.

4. The expansion installation according to one of the preceding embodiments, wherein the sensor generator (122) has a permanently magnetized sensor rotor (124) that cooperates with a stator (126) having stator windings, wherein, during rotation of the sensor rotor (124), there is produced at the stator windings of the stator (126) a voltage that is dependent on the speed of the sensor rotor (124) and represents the sensor signal.

5. The expansion installation according to one of the preceding embodiments, wherein, for the purpose of achieving the permanent magnetization, the sensor rotor (124) has a magnet material comprising rare earth elements.

6. The expansion installation according to one of the preceding embodiments, wherein the sensor generator (122) is configured such that, at a speed of rotation of the generator (34) that corresponds to a frequency of the generated AC voltage lying in the range of a grid frequency of a grid, it generates a voltage in the range between 30 V and 48 V, preferably between 40 V and 48 V.

7. The expansion installation according to one of the preceding embodiments, wherein the sensor rotor (124) of the sensor generator (122) is coupled directly and non-rotatably to a shaft end (96, 172, 182) and is carried by it.

8. The expansion installation according to one of the preceding embodiments, wherein the sensor rotor (124) of the sensor generator (122) is arranged on a rotor carrier (162, 192) that is connected to the shaft end (96, 172, 182).

9. The expansion installation according to embodiment 8, wherein the rotor carrier (162, 192) is connected to the shaft end (96) by means of a centering screw (134).

10. The expansion installation according to embodiment 8 or 9, wherein the rotor carrier (192) is centered in relation to the shaft end (96) by means of a centering cone (194).

11. The expansion installation according to one of the preceding embodiments, wherein the shaft end (96, 172, 182) that is coupled to and carries the sensor rotor (124) of the sensor generator (122) is guided in centered manner by a bearing (102, 72, 76).

12. The expansion installation according to embodiment 11, wherein the shaft end (96, 172, 182) is at a spacing from the bearing (102, 72, 76) that guides it in centered manner at most by an amount that corresponds to a diameter of the shaft end (96, 172, 182).

13. The expansion installation according to one of the preceding embodiments, wherein the sensor generator (122) is arranged in an overall casing (110) of the expansion installation (30).

14. The expansion installation according to embodiment 13, wherein the sensor generator (122) is arranged in an expander casing (62).

15. The expansion installation according to embodiment 14 wherein the sensor generator (122) is coupled to a screw shaft (56, 58).

16. The expansion installation according to one of the preceding embodiments, wherein the sensor generator (122) is arranged in a generator casing (86).

17. The expansion installation according to embodiment 16, wherein the sensor generator (122) is coupled to a generator shaft (98).

18. The expansion installation according to embodiment 17, wherein the sensor rotor (124) of the sensor generator (122) is coupled to a shaft end (96) of the generator shaft and carried by it.

19. The expansion installation according to one of the preceding embodiments, wherein the stator (136) of the sensor generator (120) is held on a casing element (88), in particular a casing element (88) that is demountable from the overall casing (110).

20. The expansion installation according to embodiment 19, wherein the casing element (88) is provided with an electrical terminal feedthrough (152).

21. The expansion installation according to one of the preceding embodiments, wherein the stator (126) of the sensor generator (122) is held stationary on a projection (94, 174, 184) of an overall casing (110) of the expansion installation (30).

22. The expansion installation according to one of the preceding embodiments, wherein the expansion device (32) has at least one expander screw (52, 54), which is driven by the expanding working medium and drives the generator (34).

23. An installation for obtaining electrical energy from heat, in particular from waste heat, comprising an expansion installation (30) that is operated in a thermodynamic circulation procedure, wherein the expansion installation (30) takes a form according to one of embodiments 1 to 16.

24. The installation according to embodiment 23, wherein it has a controller (200), which controls a circuit (10) of the circulation procedure and a power switch (206) for connecting the generator (34) to an electrical grid (210).

25. The installation according to embodiment 24, wherein the controller (200) detects the voltage generated by the sensor generator (122), determines therefrom a value of the speed of rotation of the generator (34) and, by closing the power switch (206), connects the generator (34) to the electrical grid (210) when the speed of rotation of the generator (34) gives an AC voltage of which the frequency corresponds to a grid frequency of the electrical grid (210).

26. The installation according to one of embodiments 23 to 25, wherein the controller (200) monitors the speed of rotation of the generator (34) that is coupled to the grid (210) and, if the frequency of the generated AC voltage deviates from the grid frequency, intervenes in the circuit (10) in controlling manner, adapting the speed of the generator (34).

27. The installation according to one of embodiments 23 to 26, wherein the controller (200) monitors the speed of rotation of the generator (34) that is coupled to the grid (210) and, if the difference between the frequency of the AC voltage generated by the generator (34) and the grid frequency of the grid (210) exceeds a threshold, isolates the generator (34) from the electrical grid (210) by opening the power switch (206).

28. The installation according to one of embodiments 23 to 27, wherein the controller (200), when the generator (34) is connected to the grid (210), connects stator windings (254, 256, 258) of the generator (34) to a capacitor set (242) in parallel.

29. The installation according to one of embodiments 23 to 28, wherein the controller (200), when the generator (34) is isolated from the grid (210), maintains the parallel connection of the stator windings (254, 256, 258) to the capacitor set (242) and in addition connects a resistor set (272) to it in parallel.

30. The installation according to one of embodiments 23 to 29, wherein the controller (200) isolates the generator (34) from the capacitor set (242) and the resistor set (272) for the purpose of generator start-up.

31. The installation according to one of embodiments 23 to 30, wherein the generator (34) is coupled to the electrical grid (210) by means of a converter unit (300).

32. The installation according to embodiment 31, wherein the converter unit (300) converts the electrical energy that is generated by the generator (34) at a generator frequency into electrical energy having the grid frequency of the grid (210), and feeds it to the grid (210).

33. The installation according to embodiment 31 or 32, wherein the converter unit (300) converts the electrical energy of the generator (34) into electrical energy for feeding to the grid (210) if the generator frequency lies in an operating frequency range that extends from a minimum frequency to a high frequency.

34. The installation according to embodiment 33, wherein the converter unit (300) is configured to predetermine the generator frequency of the generator (34).

35. The installation according to one of embodiments 32 to 34, wherein, as a result of cooperation between the controller (200") and the converter unit (300), the generator frequency is adaptable to the output released by the circulation procedure at the generator (34).

36. The installation according to one of embodiments 31 to 35, wherein the controller (200) uncouples the generator (34) from the converter unit (300) if the generator frequency lies outside the operating frequency range.

37. The installation according to one of embodiments 31 to 36, wherein the converter unit (300) has a DC link circuit (304) for generating electrical energy at the grid frequency.

38. The installation according to embodiment 37, wherein the converter unit (300) has a first converter (302), which is connectable to the generator (34), for feeding the DC link circuit (304).

Further features and advantages of the invention form the subject matter of the description below and the representation in the drawing of some exemplary embodiments.

DETAILED DESCRIPTION OF THE INVENTION

Figure 1:
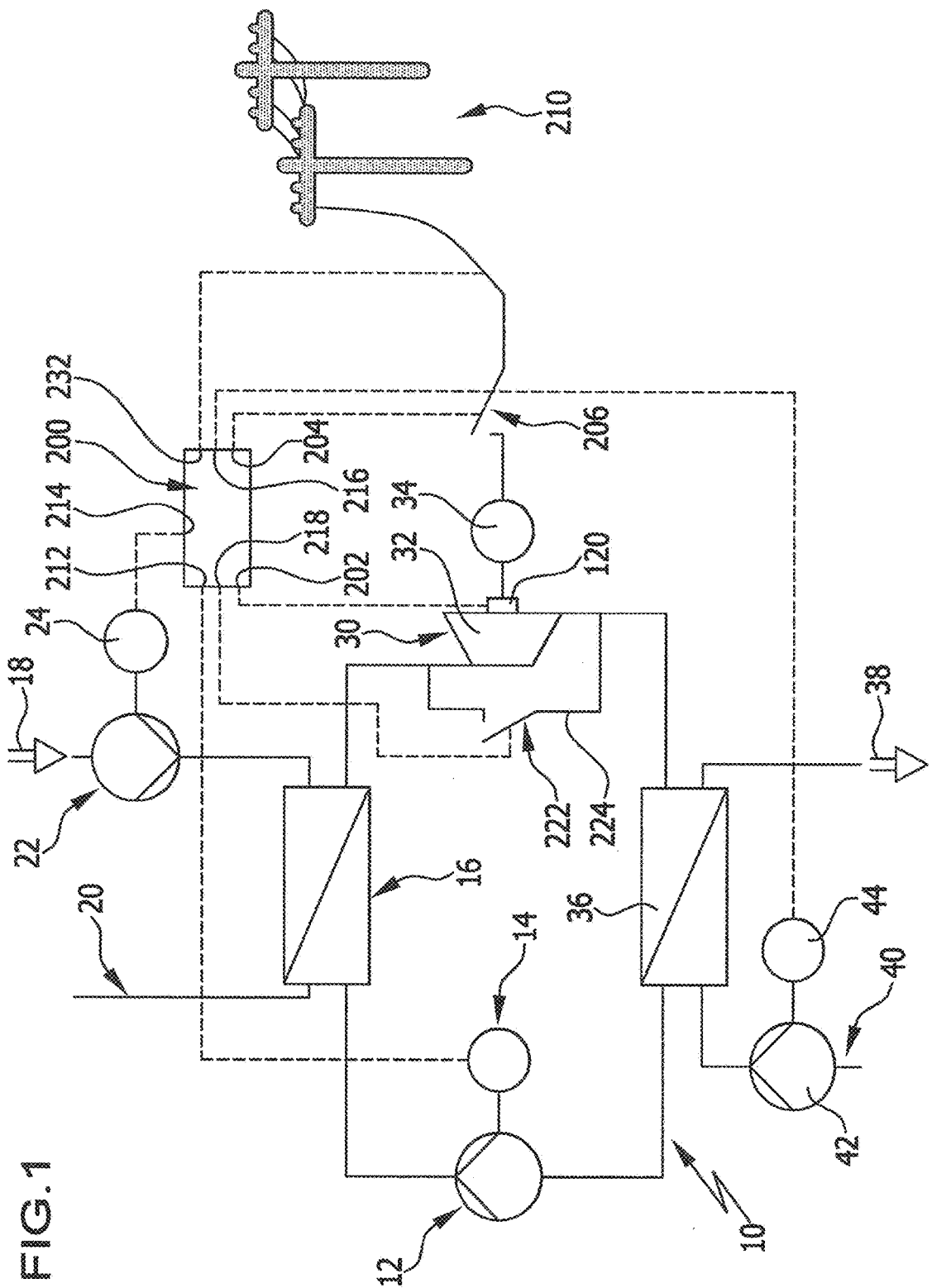
FIG. 1 shows a schematic illustration of a circulation procedure of an installation that utilizes waste heat and has an expansion installation.

An installation for obtaining electrical energy from heat, in particular for obtaining electrical energy from waste heat, comprises a circulation procedure that is illustrated in FIG. 1, in particular a circulation procedure that operates by a Rankine cycle, in which a working medium that is guided in a circuit 10 is compressed by a compressor 12 that is driven by a motor 14.

In a heat exchanger 16 downstream, the working medium is evaporated by the supply of heat from a heat stream 18.

For example, heat is supplied from the heat stream 18 by means of a hot water circuit 20, which likewise flows through the heat exchanger 16 and in which a hot water pump 22 is arranged for the purpose of circulating the hot water in the hot water circuit 20, wherein the hot water pump 22 is itself driven by a motor 24.

The working medium, which is evaporated in the heat exchanger 16 as a result of the supply of the heat stream 18, is supplied to an expansion installation 30 that is arranged downstream of the heat exchanger 16 in the circuit 10 and comprises an expansion device 32 that drives a generator 34 for the purpose of electricity generation.

After flowing through the expansion device 32, the working medium in the circuit 10 is supplied to a heat exchanger 36 in which the working medium is condensed, wherein a heat stream 38 is discharged through the heat exchanger 36.

For this purpose, in particular a cold water circuit 40 is provided that likewise passes through the heat exchanger 36, wherein there is arranged in the cold water circuit 40 a cold water pump 42 that is driven by a motor 44.

In particular, as a result of the compressor 12 there is isentropic, preferably ideal isentropic, compression of a liquid-saturated condensate of the working medium that is generated by the heat exchanger 36, and substantially isobaric evaporation of the subcooled system takes place in the heat exchanger 16 until the vapor-saturated state is reached, and in this state the working medium is then supplied to the expansion installation 30, wherein there is produced in the expansion installation 30 as a result of expansion mechanical work that drives the generator 34.

Finally, there is isobaric, in particular completely isobaric, condensation of the working medium in the heat exchanger 36 as a result of discharging the heat stream 38, such that a liquid-saturated condensate can then once again be supplied to the compressor 12.

As the working medium, there are used in particular organic working media such as R245fa, R1224yd(z), R1336mzz(Z), R1336mzz(E), R1233zd, R1234ze, R1234yf, R134a, R513a, R245fa and mixtures thereof, or similar media.

Preferably, a circulation procedure of this kind serves to exploit industrial waste heat that occurs for example in the range between 85° C. and 700° C., wherein this waste heat can be converted to electrical energy in optimum manner by the circulation procedure described above.

Figure 2:
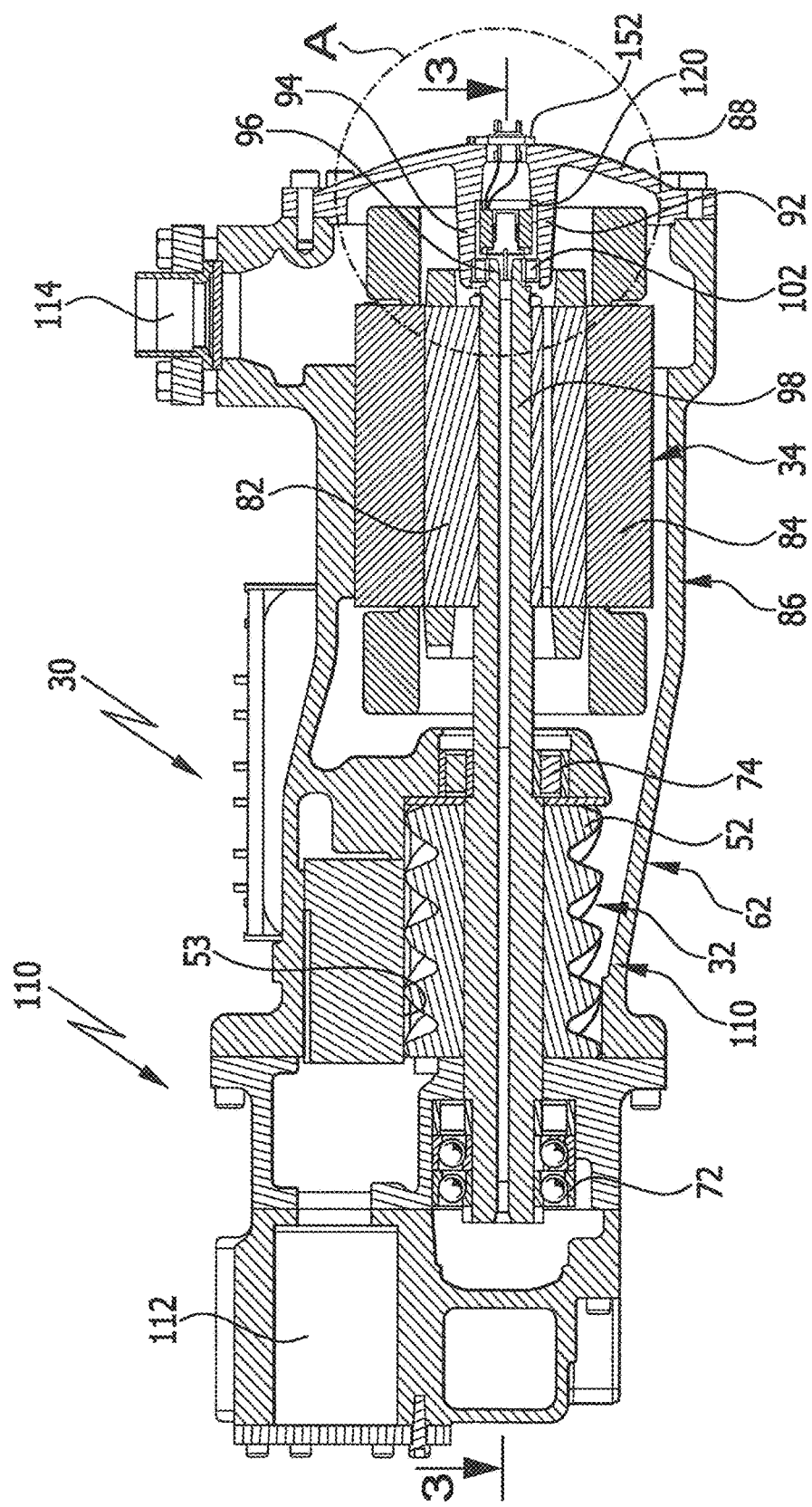
FIG. 2 shows a longitudinal section through a first exemplary embodiment of an expansion installation according to the invention.
Figure 3:
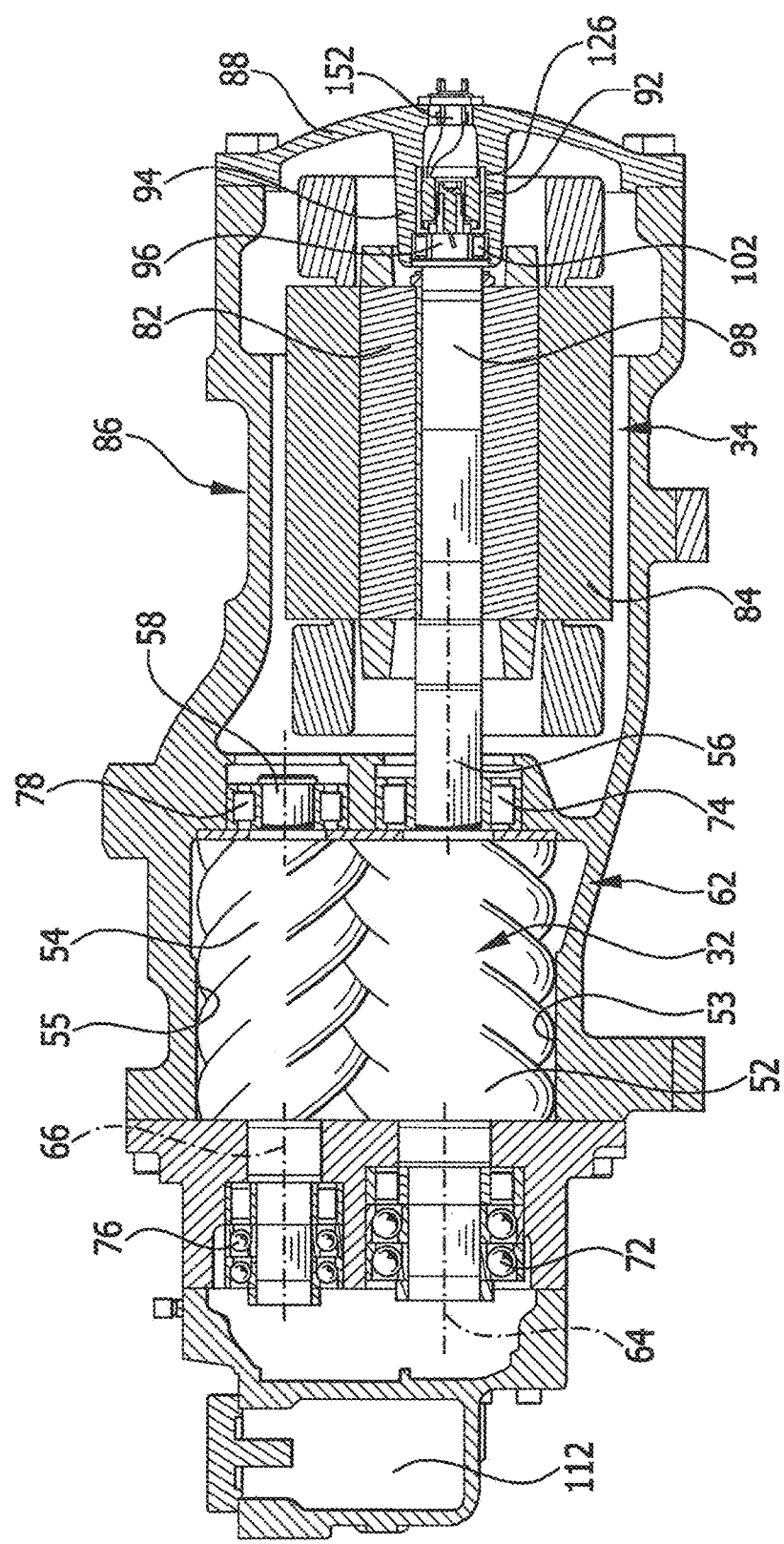
FIG. 3 shows a section along the line 3-3, through the first exemplary embodiment of the expansion installation according to the invention.
Figure 4:
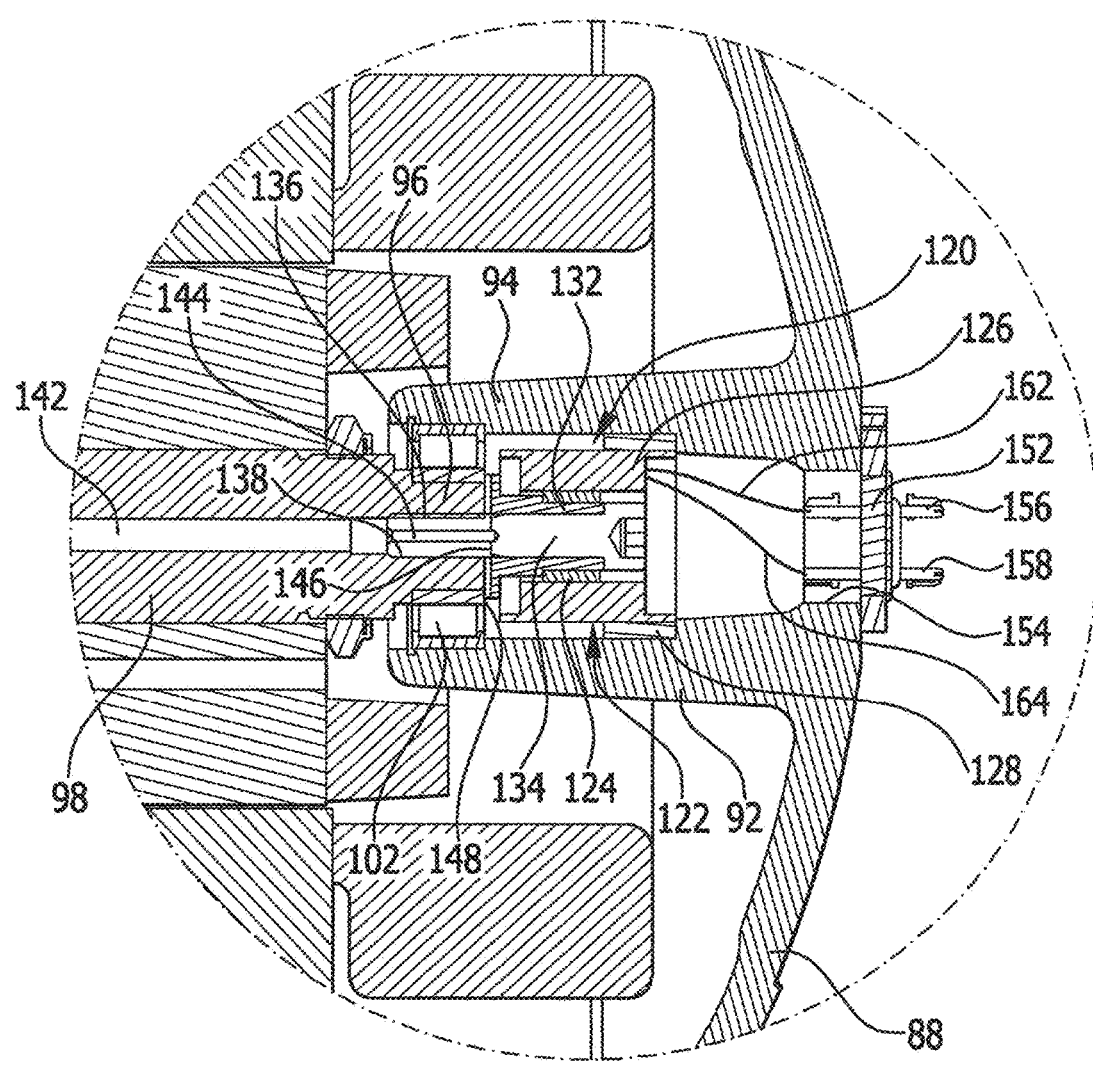
FIG. 4 shows an enlarged sectional illustration of a region A in FIG. 2.

FIGS. 2 to 4 show a first exemplary embodiment of an expansion installation 30 used in the circuit 10 described above.

The expansion device 32 takes the form for example of a screw expander that, in one embodiment, takes the form of a single-screw expander or, in the embodiment illustrated in the exemplary embodiment, has for example two mutually engaging expander screws 52 and 54, which for their part are arranged, by means of screw shafts 56 and 58 projecting beyond them at both ends, in screw bores 53, 55 in an expander casing 62 and are mounted rotatably about mutually parallel axes of rotation 64 and 66, wherein there are provided for example two bearing sets 72 and 74 for the screw shaft 56 and two bearing sets 76 and 78 for the screw shaft 58.

In this arrangement, the bearing sets 72 and 76 are arranged for example on the high-pressure side of the expander screws 52 and 54, and the bearing sets 74 and 78 are arranged on the low-pressure side of the expander screws 52, 54.

The expansion device 32 is for example coupled to the generator 34 such that one of the screw shafts, for example the screw shaft 56, is guided into the generator 34 and forms a generator shaft 98 that carries a rotor 82, which in this case is likewise mounted rotatably about the axis of rotation 64.

Further, the rotor 82 is surrounded by a stator 84 that is arranged fixed in a generator casing, which is designated 86 as a whole, wherein this generator casing 86 preferably directly adjoins the expander casing 62, for example even being connected in one piece therewith.

Preferably, the generator casing 86 is closed on an opposite side to the expander casing 62 by a casing element 88, which for example takes the form of a detachable casing cover.

For the purpose of improving the running properties of the rotor 82, the casing element 88 is provided with a bearing carrier 92 that extends from the casing element 88, for example in the form of a cylindrical projection 94, in the direction of a shaft end 96 of the generator shaft 98, which in particular takes the form of a one-piece projection of the screw shaft 56, and provides a centered mounting for the shaft end 96 by means of a bearing 102, concentrically in relation to the axis of rotation 64, in particular providing a support in addition to the bearing sets 72 and 74 in order to ensure that the rotor 82 rotating about the axis of rotation 64 runs as smoothly and precisely as possible.

In the expansion device 32 that is illustrated by way of example in FIGS. 2 and 3, the heated and pressurized working medium coming from the heat exchanger 16 enters an inlet 112 of an overall casing 110 of the expansion installation 30 comprising the expander casing 62 and the generator casing 86, then flows through the expansion device 32, in particular the chambers that are formed by the expander screws 52 and 54 with the expander casing 32, and then, after expansion, enters the generator casing 86, with the result that the expanded working medium brings about cooling of the rotor 82 and the stator 84 in the generator casing 86, and leaves the generator casing 86 through an outlet 114 (FIG. 2).

Preferably, the outlet 114 is arranged on the generator casing 86, on an opposite side of the generator 34 to the expansion device 32.

For the purpose of precise detection of the speed of rotation of the generator 34, in the first exemplary embodiment of the expansion installation 30 there is associated with the shaft end 96 of the generator shaft 98 a rotational speed sensor 120, which is preferably arranged in the cylindrical projection 94 of the casing element 88 and faces the shaft end 96, with the result that the rotational speed sensor 120 is able to detect the speed of the shaft end 96.

Preferably here, the rotational speed sensor 120 takes the form of an electric sensor generator 122 of which the sensor rotor 124 is permanently magnetized, preferably being magnetized at a high field strength that can be produced for example by using magnets of rare earth elements such as in particular NdFeB or SmCo, which ensure a high permanent field strength.

For example, the sensor rotor 124 has multiple poles, in particular four poles or six poles.

Further, the rotational speed sensor 120 comprises a stator 126 that surrounds the sensor rotor 124, carries the stator windings and is itself held, non-rotatably and coaxially with the axis of rotation 64, in the cylindrical projection 94 of the generator casing 86 by a centering element 128.

It is particularly advantageous in the rotational speed sensor 120 if the sensor rotor 124 is coupled directly to the shaft end 96 and carried by it.

So that the sensor rotor 124 of the sensor generator 122 is guided such that it is centered as precisely as possible in relation to the axis of rotation 64, the shaft end 96 lies as close as possible to the bearing 102 that guides it in centered manner, in particular at a spacing from the bearing 102 that is smaller than a diameter of the shaft end 96.

For this purpose there is provided a rotor carrier 132 that carries the sensor rotor 124 and is centered in relation to the generator shaft 98 by means of a centering screw 134, which engages in an end-face thread 138 in the shaft end 96 by means of a threaded portion 136, wherein the rotor carrier 132 is coupled non-rotatably to the generator shaft 98.

In order in addition to enable sufficient lubrication of the bearing 102 by way of a lubricant duct 142 that passes through the generator shaft 98, the centering screw 134 is provided with a lubricant duct 144 that runs coaxially with the lubricant duct 142 and with lubricant ducts 146 that run radially in relation to the lubricant duct 144, wherein the lubricant ducts 146 also extend through the rotor carrier 132 and have exit openings 148 that allow the lubricant to exit close to the bearing 102, on a side of the shaft end 96 that is remote from the rotor 82, into the space that surrounds the cylindrical projection 94, that receives the rotational speed sensor 120, and from which lubrication of the bearing 102 is performed.

It follows from this that the rotational speed sensor 120 takes a form such that it operates without disruption and reliably over the long term, both in the area around the lubricant and also where appropriate in the working medium of the circuit 10 that is entrained by the lubricant.

In the first exemplary embodiment illustrated, according to FIG. 4, contact is made with the stator windings of the stator 126 by way of a terminal feedthrough 152 that is for example associated in an aperture 154 in the casing element 88 and closes it off, with the result that, for making contact with the stator windings of the stator 126 of the rotational speed sensor 120, there are available two contacts 156 and 158, which lie outside the generator casing 86 and are connected by way of the terminal feedthrough 152 to lines 162 and 164 that lead to the stator 126 and in particular its stator windings.

Because the sensor generator 122 that forms the rotational speed sensor 120 has a permanently magnetized sensor rotor 124, the rotational speed sensor 120 generates, as the sensor signal, a voltage that is proportional, in particular strictly proportional, to the speed of the generator shaft 98.

Preferably here, the sensor generator 122 having its sensor rotor 124 and the stator 126 is configured such that, when the generator 34 generates an AC voltage with a frequency corresponding to a grid frequency of an electrical grid 210 that is to be fed from the generator 34, for example 50 Hz or 60 Hz, the sensor generator 122 generates as a sensor signal an electrical voltage below 48 V but preferably in the range between 30 V and 48 V, or even better in the range between 40 V and 48 V, in order to be able to measure the speed of the generator shaft 98 in the range of the relevant grid frequency on the one hand as precisely as possible—that is to say by a sensor signal having as high a voltage as possible—but on the other hand avoiding the use of high-voltage components that would have to be used at voltages above 48 V.

A particularly advantageous embodiment provides for the sensor generator 122 to be a standard generator having a permanently magnetized rotor.

In particular here, the voltage generated by the sensor generator 122 may be either an AC voltage or a DC voltage, either of which can be measured directly, that is to say without any electrical conversion.

The solution according to the invention is also in particular suitable for use with existing expansion installations 30 if they are constructed such that the casing element 88 of the generator casing 86 has the bearing carrier 92, in particular in the form of a cylindrical projection 94, such that within the cylindrical projection it is possible to retrofit the sensor generator 122 in the projection 94, simply by removing the casing element 88.

Preferably, in the illustrated exemplary embodiment the generator 34 can be connected up to a grid 210 by a power switch 206 for the purpose of supplying a multiplicity of consumers, wherein the grid is configured to transmit an alternating current at a defined stable frequency.

Measurement of the voltage is performed by the controller 200 illustrated in FIG. 1 at a measuring input 202 that is provided for this purpose and is connected to the rotational speed sensor 120, in particular the electrical contacts 156 and 158, by way of an appropriate line.

Further, by way of an output 204 the controller 200 controls the power switch 206, which connects an electrical output of the generator 34 to the electrical grid, which is designated 210 as a whole, such that the generator 34 can feed the generated electrical energy to the grid.

Further, preferably the controller 200 also takes a form such that it operates the motor 14 of the compressor 12 by way of an output 212, operates the motor 24 of the hot water pump 22 by way of an output 214, and operates the motor 44 of the cold water pump 42 by way of an output 216.

In addition, it is provided for the controller 200 to control operation of a switch valve 222 in a bypass line 224 to the expansion device 32, by way of an output 218.

Moreover, the controller 200 favorably also has an input 232 by way of which a condition of the electrical grid 210 is detected, in particular in respect of its frequency and voltage.

In a second exemplary embodiment of the expansion installation 30' according to the invention (FIG. 5), the elements that are identical to those of the first exemplary embodiment are provided with the same reference numerals, so reference is made to the statements relating to the first exemplary embodiment for a description thereof.

Figure 5:
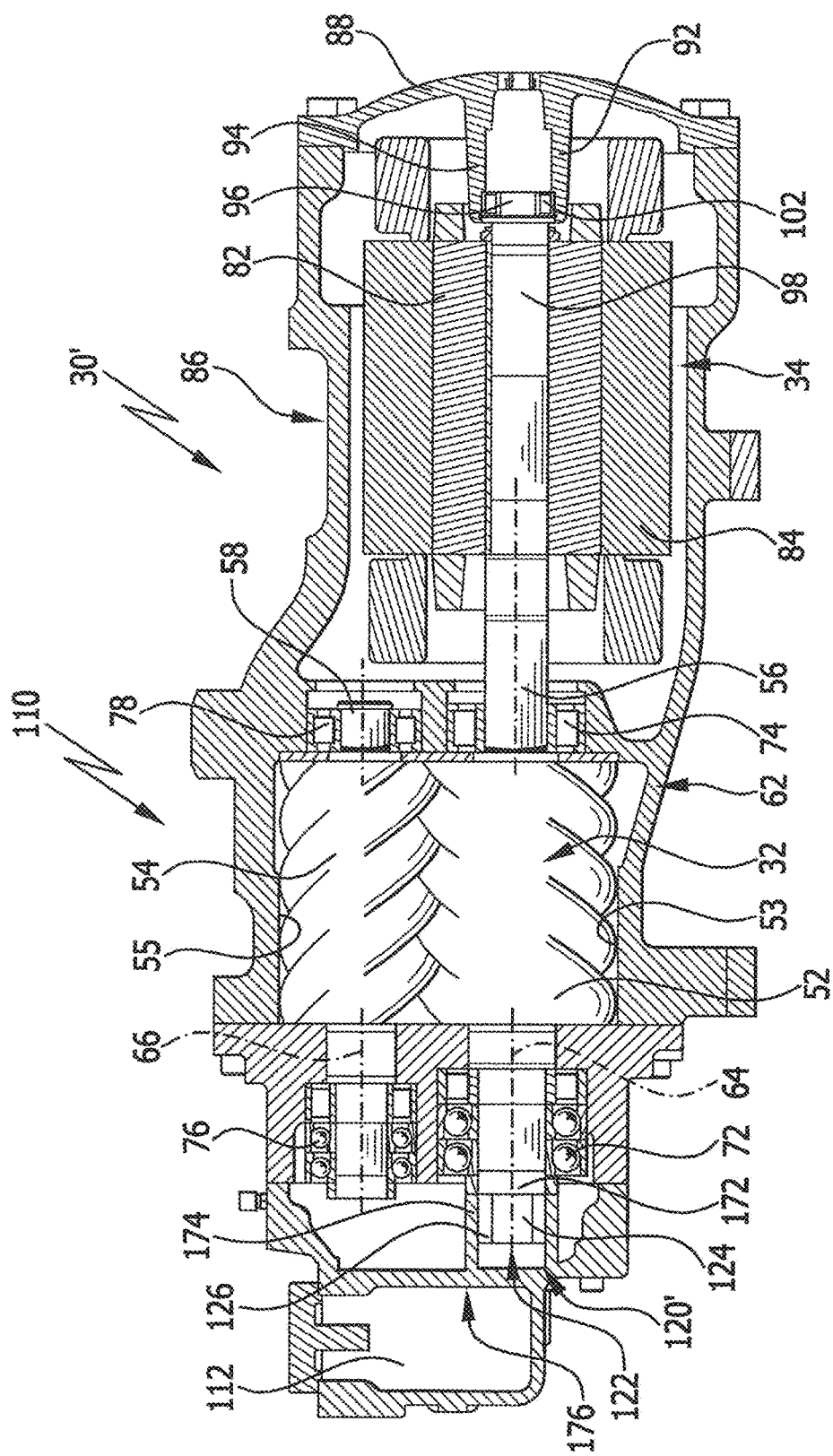
FIG. 5 shows a section similar to FIG. 3, through a second exemplary embodiment of an expansion installation according to the invention.

Unlike the first exemplary embodiment, as illustrated in FIG. 5 the rotational speed sensor 120', which takes the form of an electrical generator 122, is arranged on the screw shaft 56 on an opposite side of the bearing set 72 to the expander screw 52, wherein the sensor rotor 124 is coupled to a shaft end 172 and carried by it, while the stator 126 is received such that it is stationary in a projection 174 of a bearing casing 176.

Otherwise, the sensor generator 122 functions in the same way as in the first exemplary embodiment, and is connected to the controller 200 in the same way as in the first exemplary embodiment.

In a third exemplary embodiment of the expansion installation 30" according to the invention (FIG. 6), the elements that are identical to those of the first exemplary embodiment are provided with the same reference numerals, so reference is made to the statements relating to the first exemplary embodiment for a description thereof.

Figure 6:
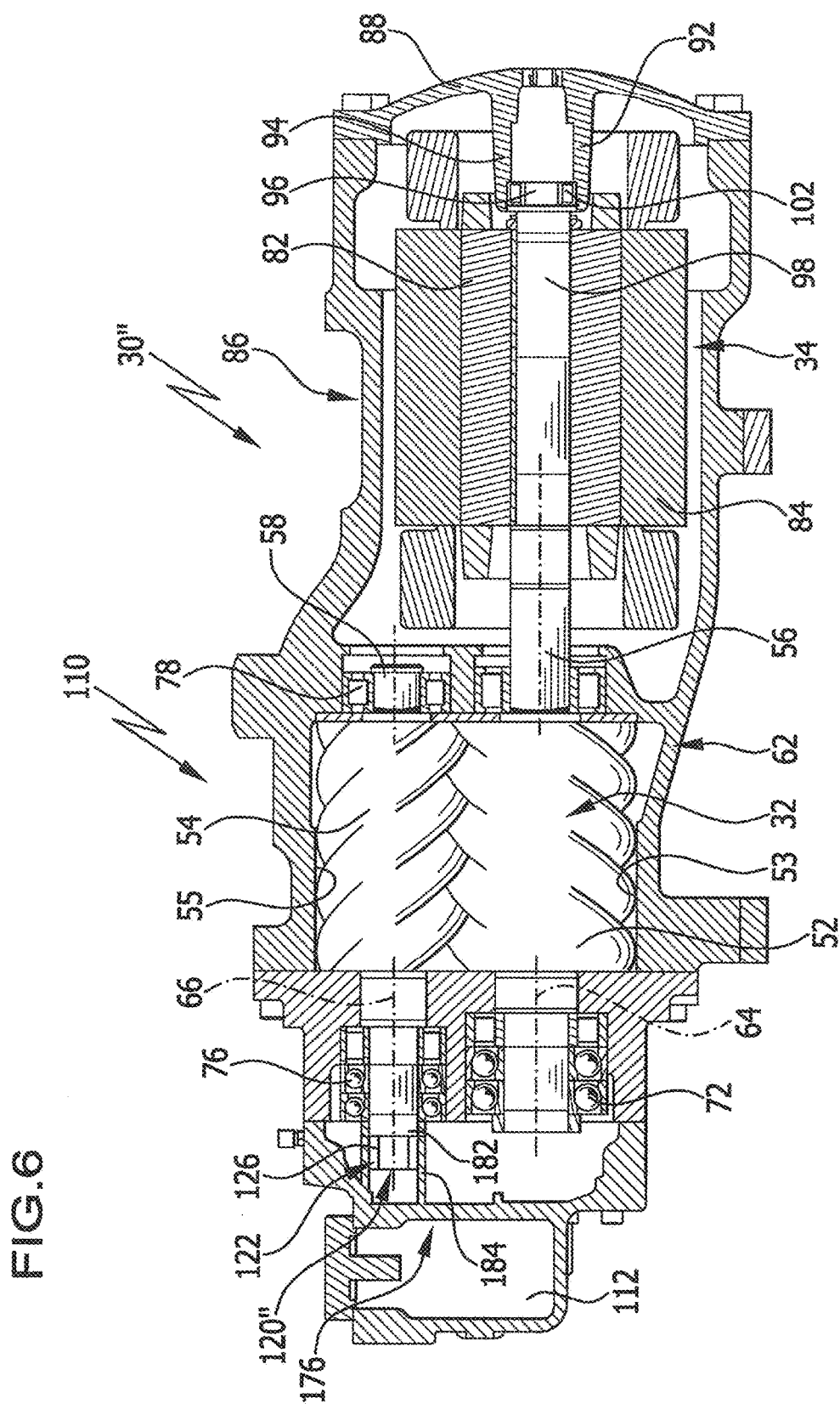
FIG. 6 shows a section similar to FIG. 3, through a third exemplary embodiment of an expansion installation according to the invention.

Unlike the first exemplary embodiment, as illustrated in FIG. 6 the rotational speed sensor 120", which takes the form of an electrical generator 122, is arranged on the screw shaft 58 on an opposite side of the bearing set 76 to the expander screw 54, wherein the sensor rotor 124 is coupled to a shaft end 182 of the screw shaft 58 and carried by it, while the stator 126 is received such that it is stationary in a projection 184 of the bearing casing 176.

Because the expander screw 54 cooperates with the expander screw 52 that drives the generator 34, its speed is proportional to the speed of the generator 34, with the result that the voltage generated by the sensor generator 122 is likewise a sensor signal that is representative of the speed of the generator 34.

Otherwise, the sensor generator 122 functions in the same way as in the first exemplary embodiment, and is connected to the controller 200 in the same way as in the first exemplary embodiment.

Figure 7:
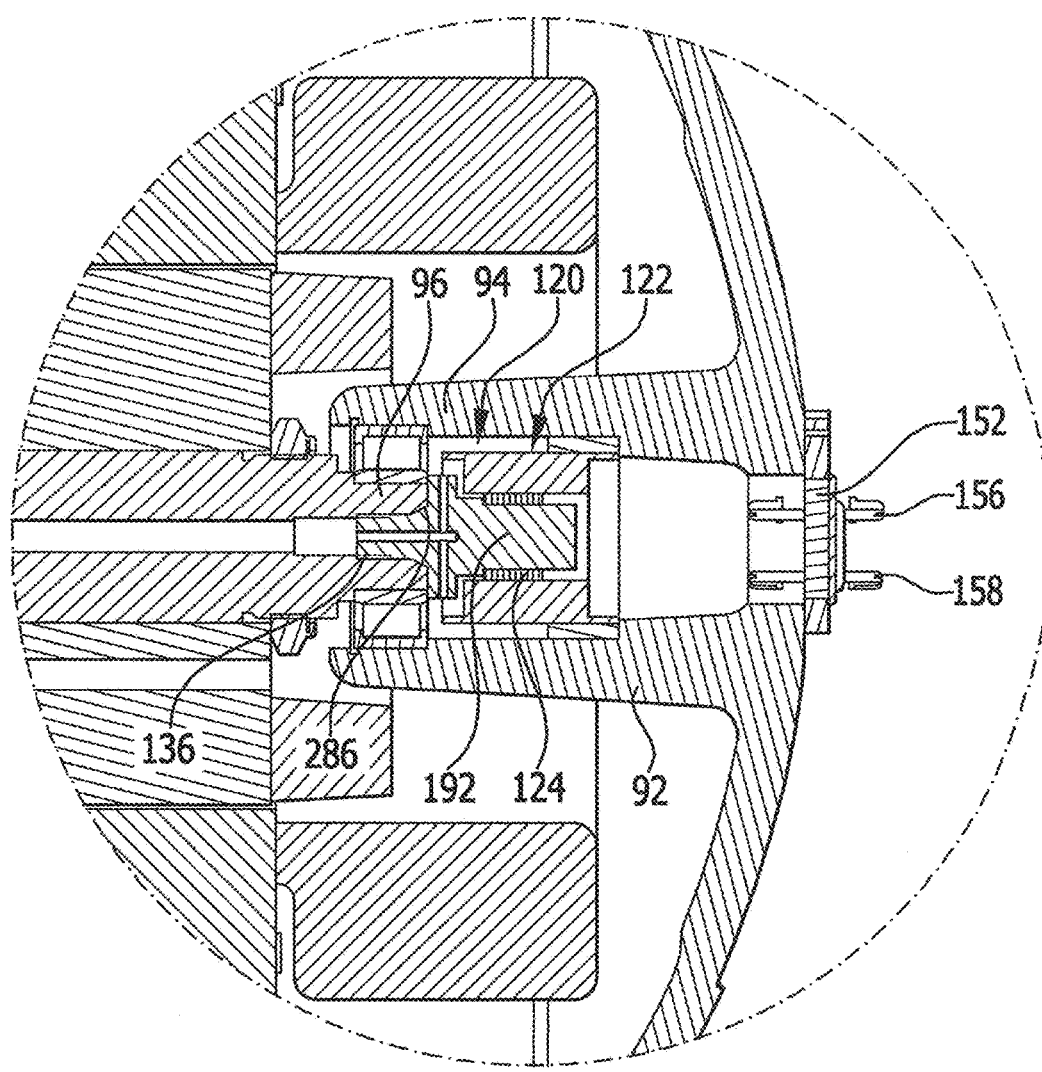
FIG. 7 shows an enlarged section similar to FIG. 4, through a fourth exemplary embodiment of an expansion installation according to the invention.
Figure 8:
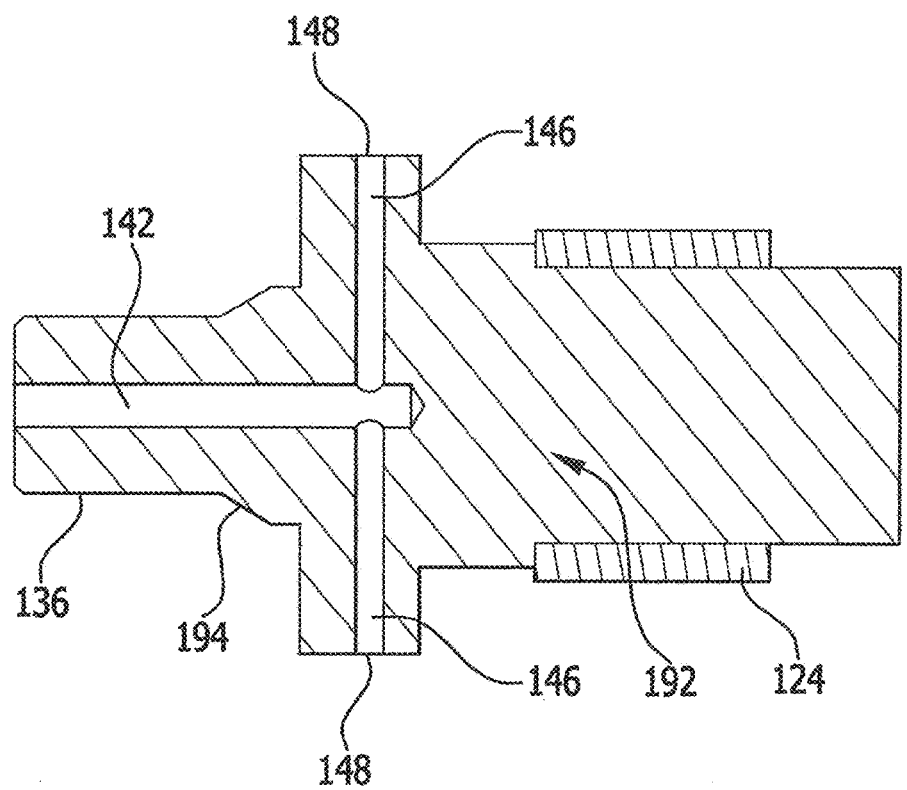
FIG. 8 shows an enlarged illustration of a rotor carrier according to the fourth exemplary embodiment of the expansion installation according to the invention.

In a fourth exemplary embodiment of the solution according to the invention, which is illustrated in FIG. 7 and FIG. 8, mounting of the sensor rotor 124 of the sensor generator 122, which operates as a rotational speed sensor 120, is improved and simplified.

Otherwise, in the fourth exemplary embodiment the parts that are identical to those of the first exemplary embodiment are provided with the same reference numerals, so reference may be made to the statements above relating to the first exemplary embodiment in their entirety.

In the fourth exemplary embodiment, the rotor carrier 132 and the centering screw 134 are combined into a single rotor carrier 192, which is configured to be screwed into the shaft end 96, and which on the one hand itself directly carries the sensor rotor 124 and also has, following on from the threaded portion 136, a centering cone 194 that cooperates with a centering cone 286 in the shaft end 96, thus resulting in an additional centering of the rotor carrier 192 in relation to the axis of rotation 64 in order to achieve improved centering of the rotor 124 (FIGS. 7, 8).

In particular, as a result of combining the rotor carrier 132 and the centering screw 134 any play between these is also eliminated.

Moreover, the rotor carrier 192 likewise also comprises the lubricant duct 142 that runs parallel to the axis of rotation 64, and the two lubricant ducts 146 that run radially thereto and have the exit openings 148, which are arranged in the same way as in the first exemplary embodiment (FIGS. 7, 8).

Figure 9:
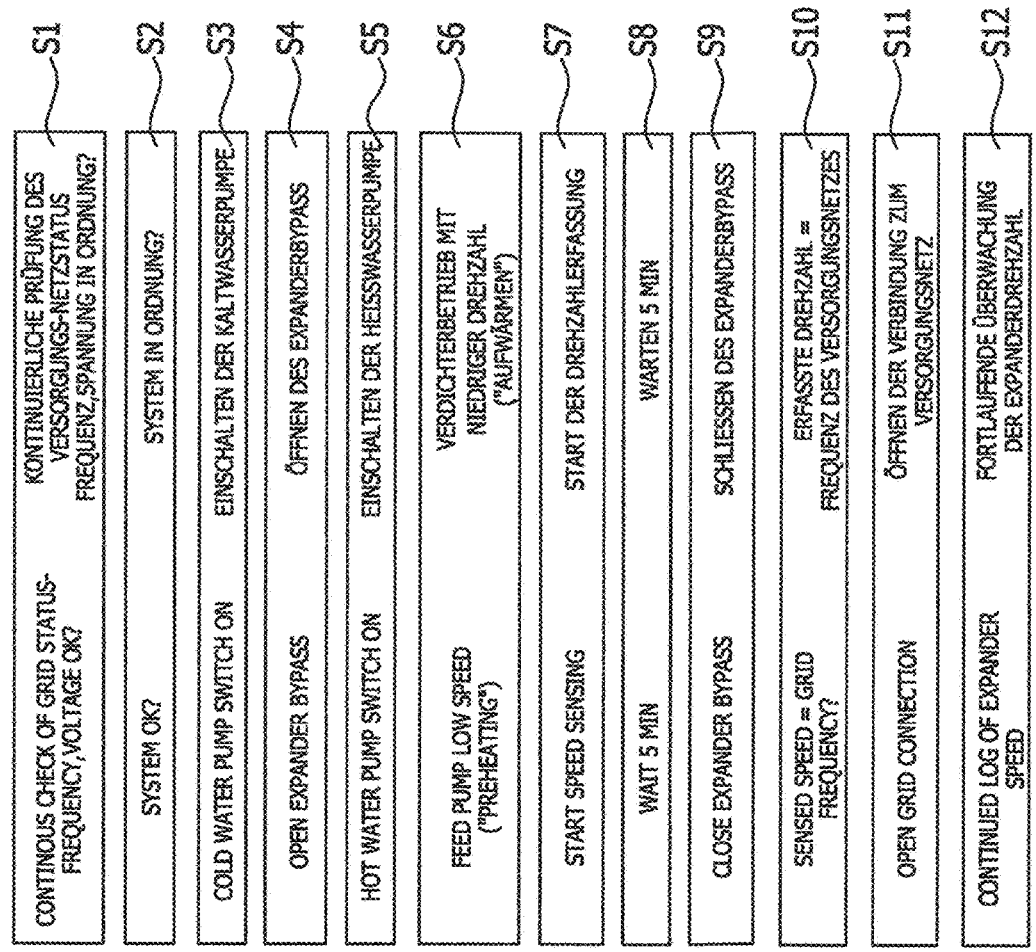
FIG. 9 shows a flow chart, which shows a start-up of the expansion installation illustrated in FIG. 1 in conjunction with the circulation procedure 10 into which the expansion installation is incorporated.
Figure 10:
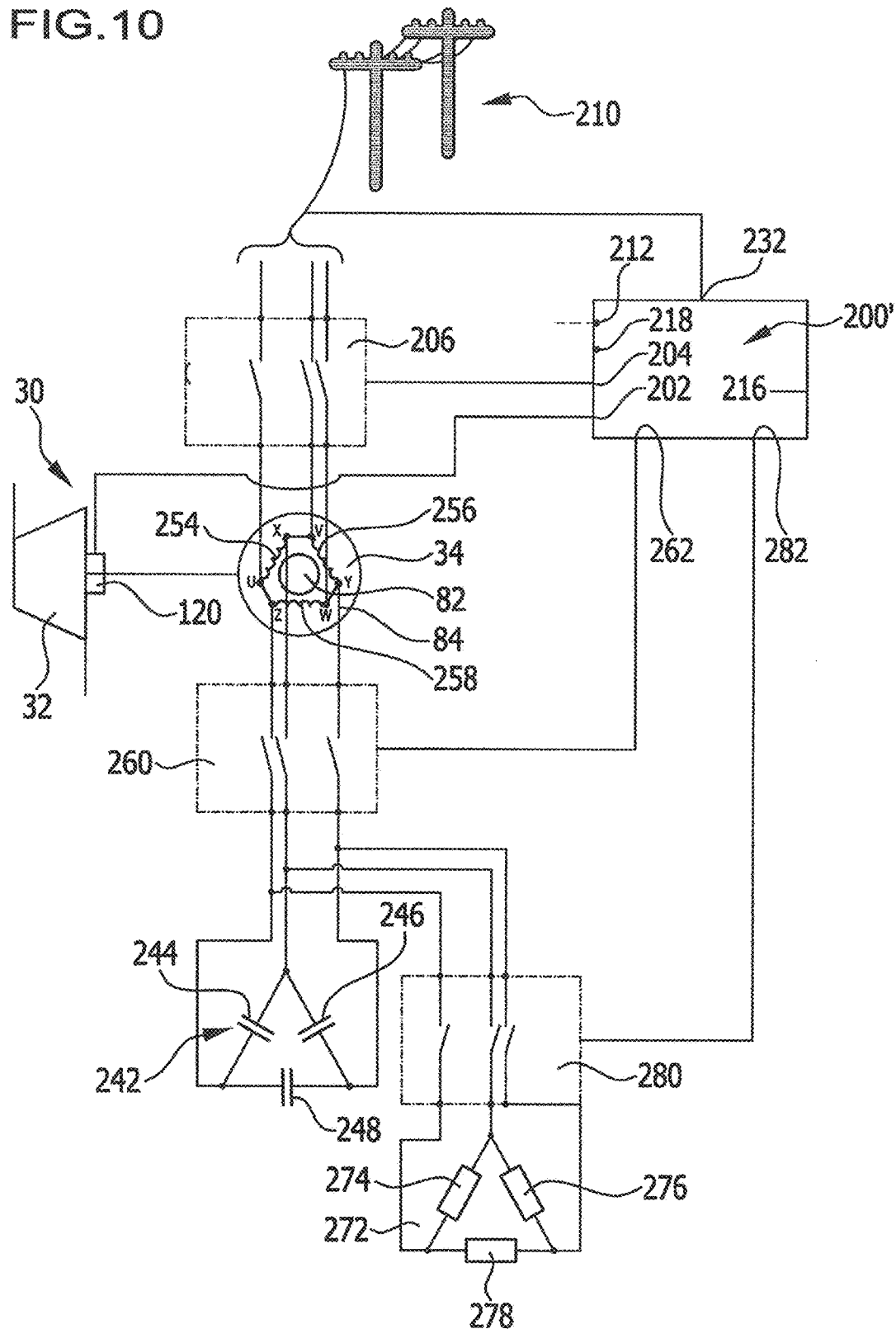
FIG. 10 shows a detail of a schematic illustration of a fifth exemplary embodiment of an installation according to the invention having an expansion installation.

The above-described exemplary embodiments of the expansion installations 30 according to the invention are started up at the controller 200, for example according to the sequence illustrated in FIG. 9.

In a first step S1, the status of the grid 210 is continuously checked, in particular in respect of the voltage and frequency in the electrical grid, detected at the input 232.

Then, in a step S2, all the components of the circuit 10 and the expansion installation 30—that is to say in particular the expansion installation 30 with the generator 34 and the rotational speed sensor 120—are checked.

In a third step S3, the motor 44 of the cold water pump is switched on in order to put the cold water circuit 40 in operation and thus to ensure that the working medium condenses in the heat exchanger 36.

In a further step S4, the switch valve 222 is closed in order to bring into operation the bypass line 24 for the expansion installation 30, such that a substantial portion of the working medium heated in the heat exchanger 16 flows not through the expansion installation 30, in particular not through the expansion device 32, but through the bypass line 224.

For example, the proportion of the working medium that flows through the expansion device 32 is less than 10% of the total heated working medium exiting from the heat exchanger 16.

In a further step S5, the motor 24 of the hot water pump 22 is switched on in order to bring the hot water circuit 20 into operation and thus to heat up the heat exchanger 16 so that working medium evaporates therein.

Thereafter, in step S6, the motor 14 for operation of the compressor 12 is switched on, wherein the compressor 12 first operates at a small output in order to heat up the entire system.

In the following step S7, detection of the speed of the generator 34 by the rotational speed sensor 120 begins, in order to detect how quickly the generator 34—which in this case operates under no load and is driven by only a relatively small proportion of the working medium—accelerates.

In the following step S8, there is a wait of a certain period and the entire system continues to be heated up.

In the following step S9, the switch valve 222 is opened in order to disconnect the bypass line 224.

Once the bypass line 224 has been disconnected, the speed of the generator 34 increases relatively quickly, monitored by the rotational speed sensor 120, and once a speed of the generator 34 at which it generates an AC voltage at a frequency that deviates only slightly from the frequency of the electrical grid 210 has been detected, in step S10, the controller 200 closes the power switch 206, in step S11, with the result that the generator 24 now runs under load at the grid 210 and its speed is stabilized by the grid 210 itself, such that in the following step S12 the speed of the generator 24 continues to be monitored by the rotational speed sensor 120 and the controller 200 only for the sake of safety.

If, during this, the speed of the generator 34 produces an AC voltage at a frequency that deviates from the grid frequency by more than a predetermined set value, the controller 200 makes an adjusting intervention in the circuit 10, for example activating the bypass line 224 by means of the switch valve 222 in order to reduce the speed of the generator 34 again or, where appropriate by opening the power switch 206, to isolate the generator 34 from the grid 210.

In a fifth exemplary embodiment of an installation according to the invention for obtaining electrical energy from heat, comprising an expansion installation according to one of the exemplary embodiments above, the elements that are identical to the elements above are provided with the same reference numerals, so reference may be made to the statements relating to these elements in their entirety.

Unlike the exemplary embodiments above, there is also connectable to the generator 34 a capacitor set 242, which has for example capacitors 244, 246, 248 that are arranged in a triangular circuit and are connectable in parallel in particular to individual stator windings 254, 256 and 258 of the generator, wherein for this purpose a connection switch 260 is also provided that is controllable by way of an output 262 of the controller 200'.

In addition, a resistor set 272 is also connectable to the capacitor set 242, wherein individual resistors 274, 276 and 278 of the resistor set 272 may be connected in parallel to respective capacitors 244, 246, 248.

For this purpose, there is provided a resistor connection switch 280, which is connected to an output 282 of the controller 200' and is thus controllable by the controller 200'.

The fifth exemplary embodiment operates such that—as described in conjunction with the first exemplary embodiment—the generator 34 can be connected up by the power switch 206 if it delivers AC voltage at a frequency corresponding to the grid frequency of the grid 210.

In addition to connecting the generator 34 up to the grid 210 by means of the power switch 206, it is also possible for the connection switch 260 to connect the capacitor set 242 to the stator windings 254, 256 and 258 in parallel, wherein the capacitor set 242, with its capacitors 244, 246 and 248, serves to make an adaptation to the output as regards reactive and active power.

In this case, the controller 200' closes the connection switch 260 if the power switch 206 is likewise closed and so the generator 34 outputs electrical energy to the grid 210. However, if the power switch 206 is opened the connection switch 260 initially continues to remain closed.

In addition, the resistor connection switch 280 is closed by the controller 200' such that the individual resistors 274, 276 and 278 are now connected to the capacitors 244, 246 and 248 in parallel.

This has the result that on the one hand a voltage is now applied at the stator windings 254, 256 and 258 and thus, as the rotor 82 of the generator 34 continues to rotate, the rotor 82 is decelerated, because the electrical energy that is still generated by the generator 34 is converted to heat in the resistors 274, 276 and 278, resulting in deceleration of the rotor 82 of the generator 34.

As soon as the rotor 82 of the generator 34 is at a standstill, the controller 200' opens the resistor connection switch 280 and moreover the controller 200' opens the connection switch 260, with the result that the capacitor set 242 is likewise no longer connected in parallel to the stator windings 254, 256 and 258 of the generator 34.

If the generator 34 is put in operation again, the controller 200' uses the rotational speed sensor 120 to detect the rotary movement of the rotor 82, wherein—as for example described above—the speed of the rotor 82 is increased by starting up the circuit 10, and so the frequency of the AC voltage generated by the generator 34 is also increased.

During this phase, the stator windings 254, 256 and 258 are not connected to the capacitor set 242.

Only once the generator 34 is connected up to the grid 210 by the controller 200' by way of the power switch 206 is the capacitor set 242 once again connected by way of the connection switch 260 in order likewise—as already mentioned above—to make the power adaptation.

However, the resistor connection switch 280 continues to remain open, and thus the resistor set 272 remains isolated from the capacitor set 242 until the power switch 206 is opened again. Only then is the resistor set 272 once again, by way of the resistor connection switch 280, connected up to the capacitor set 242, which brings about the above-described effect of decelerating the rotor 82 of the generator 34.

Figure 11:
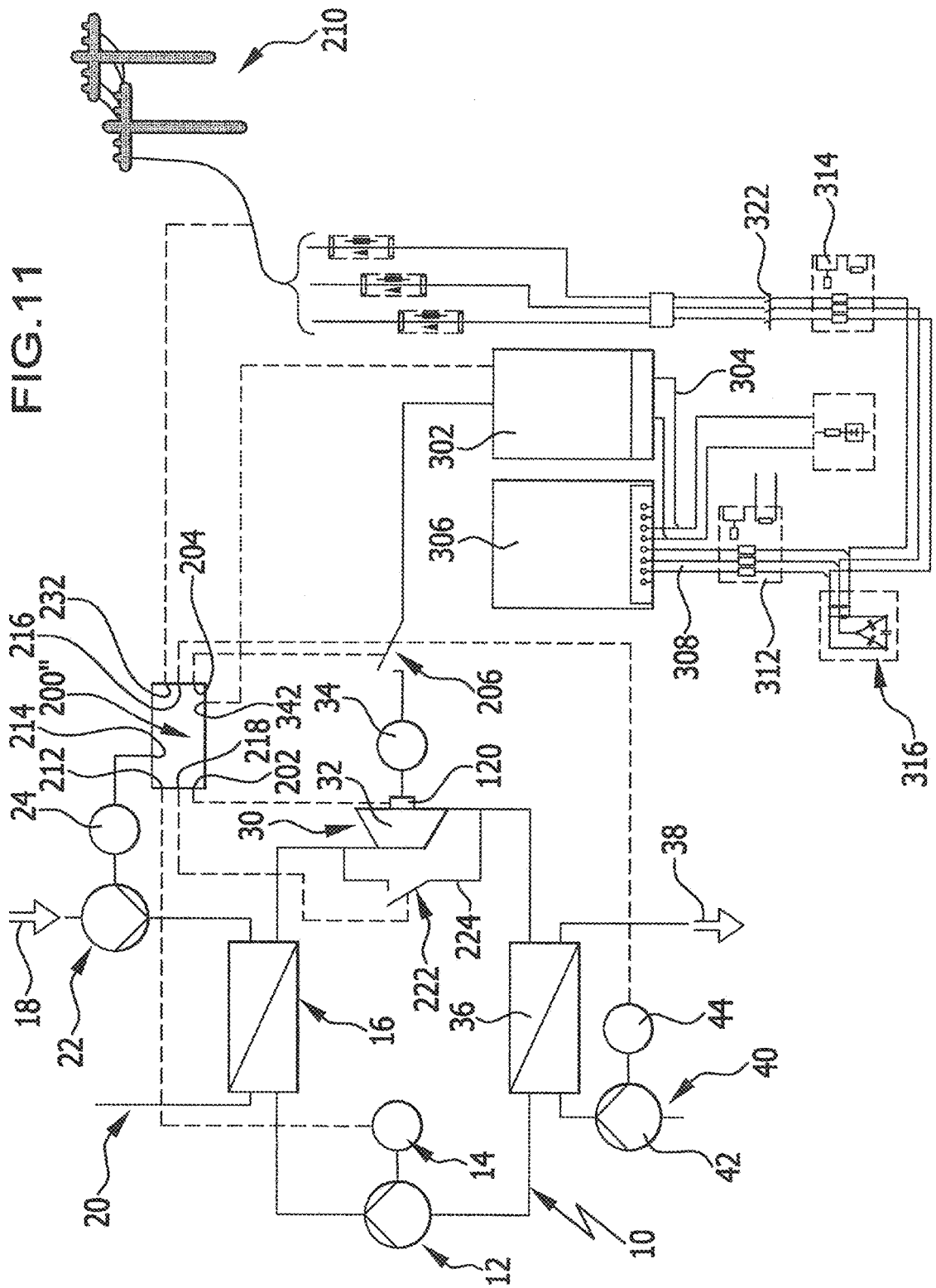
FIG. 11 shows a schematic illustration, similar to FIG. 1, of a sixth exemplary embodiment of an installation according to the invention having an expansion installation.

In a sixth exemplary embodiment of an installation according to the invention having an expansion installation, illustrated in FIG. 11, the electrical energy generated by the generator 34 is supplied to a converter unit 300 by way of the power switch 206. This converter unit 300 comprises a first converter 302, which supplies the alternating current, in particular the three-phase alternating current generated by the generator 34, to a DC link circuit 304 of the converter unit 300 in the form of direct current.

This DC link circuit 304 is itself in turn connected to a second converter 306 of the converter unit 300, which once again converts the direct current of the DC link circuit 304 and supplies it to an AC output circuit 308 at the grid frequency corresponding to the grid 210.

Provided in the AC output circuit 308 are a first inductor set 312 and a second inductor set 314, and between the two inductor sets 312 and 314 there is provided a capacitor set 316, with the result that, by means of the inductor sets 312 and 314 and the capacitor set 316, it is possible to adapt the alternating current generated by the second converter 306 to the grid 210 in optimum manner.

Further, the AC output circuit 308 is also connectable to the grid 210 by way of an output switch 322.

In this sixth exemplary embodiment, the controller 200'' takes a form such that, by way of the power switch 206, it only connects the generator 34 to the first converter 302 when the generator 34 is rotating at a minimum speed, detected by the rotational speed sensor 120.

For example, the minimum speed of the generator 34 is dimensioned such that the generated alternating current has a generator frequency that corresponds approximately to a minimum frequency lying in the range from 20 Hz to 30 Hz.

Above this minimum frequency, an operating frequency range for the first converter 302 is reached, so then the first converter 302 feeds direct current to the DC link circuit 304.

Thus, in this operating frequency range the second converter 306 is then also able to generate an alternating current in the AC output circuit 308 at a frequency corresponding to the grid frequency of the grid 210.

Thus, the controller 200" is able to control the first converter 302 by way of an output 342 such that, once the minimum frequency of the alternating current is reached, it operates the first converter 302 such that its converter frequency is a few Hz, for example 1 to 3 Hz, lower than the generator frequency, in order by decelerating the generator 34 to draw energy from it and hence to feed the electrical energy generated by the generator 34 to the DC link circuit 304.

In contrast to this, the second converter 306 is always operated such that it generates an alternating current of exactly the grid frequency of the grid 210 and feeds it to the AC output circuit 308.

Thus, the controller 200" is able to operate the generator 34 in a speed range that results in an alternating current that, within the operating range, can vary between the said minimum frequency and a maximum frequency lying for example between 60 and 80 Hz, since it is always possible to feed the generated alternating current to the DC link circuit 304 by way of the first converter 302.

In this case, the controller 200" will in particular operate the circulation procedure such that as optimum as possible an energy yield is available at the generator 34 for feeding to the grid 210.

If problems arise in the grid 210, then the controller 202' is able to isolate the second converter 306 from the grid by way of the output switch 322 and thus avert damage to it.

Similarly, the controller 200" is able to isolate the first converter 302 from the generator 34 if its speed results in generator frequencies of the generated alternating current that lie outside the operating range that extends between the minimum frequency and the maximum frequency.

In a modification of the first exemplary embodiment, the sixth exemplary embodiment of the installation according to the invention can be operated such that steps S1 to S7 in FIG. 9 are performed by the controller 200" in the same way as that described in conjunction with the controller 200.

However, it is possible to perform step S9 already after an operating period that is much shorter than that according to step S8, and in step S10, as soon as a generator frequency corresponding to the operating frequency range is reached, to feed the electrical energy generated at the generator frequency to the grid 210, according to step S10.

Thereafter, the controller 200" successively increases the generator frequency within the operating frequency range in order to make it possible to feed even more electrical output from the generator 34 to the grid 210.

In this arrangement, the controller 200" will on the one hand optimize the sequences in the circulation procedure such that as much electrical energy as possible is produced at the generator 34 and can be fed to the grid 210, wherein adaptation of the first converter 302 to the generator frequency is always performed on the basis of the sensor signals from the rotational speed sensor 120 provided the generator frequency lies within the operating frequency range.

However, it is also possible for the controller 200" to increase the generator frequency only to a defined frequency, for example an operating frequency corresponding to the grid frequency, and then to keep it at this frequency.

The invention claimed is:

1. An expansion installation comprising an expansion device, which is operated by an expanding working medium, and further comprising a generator driven by the expansion device, wherein the expansion installation is provided with a rotational speed sensor, which is coupled to a shaft of the expansion installation that rotates proportionally to a rotor of the generator, and which takes the form of an electrical sensor generator having a permanently magnetized sensor rotor and a stator that generates an electrical sensor signal, which electrical sensor generator generates as a sensor signal an electrical voltage.

2. The expansion installation as claimed in claim 1, wherein the sensor generator is arranged in an overall casing of the expansion installation and is exposed therein to an organic working medium within an operating Rankine cycle, and a lubricant.

3. The expansion installation as claimed in claim 2, wherein the stator of the sensor generator is held on a casing element, wherein the casing element is demountable from the overall casing.

4. The expansion installation as claimed in claim 3, wherein the casing element is provided with an electrical terminal feedthrough.

5. The expansion installation as claimed in claim 2, wherein the sensor rotor of the sensor generator is coupled directly and non-rotatably to a shaft end and is carried by it.

6. The expansion installation as claimed in claim 5, wherein the sensor rotor of the sensor generator is arranged on a rotor carrier that is connected to the shaft end.

7. The expansion installation as claimed in claim 6, wherein the rotor carrier is connected to the shaft end by means of a centering screw.

8. The expansion installation as claimed in claim 6, wherein the rotor carrier is centered in relation to the shaft end by means of a centering cone.

9. The expansion installation as claimed in claim 5, wherein the shaft end that is coupled to and carries the sensor rotor of the sensor generator is guided in centered manner by a bearing.

10. The expansion installation as claimed in claim 9, wherein the shaft end is at a spacing from the bearing that guides it in centered manner at most by an amount that corresponds to a diameter of the shaft end.

11. The expansion installation as claimed in claim 2, wherein the stator of the sensor generator is held stationary on a projection of an overall casing of the expansion installation.

12. The expansion installation as claimed in claim 1, wherein the sensor generator has a permanently magnetized sensor rotor that cooperates with a stator having stator windings, wherein, during rotation of the sensor rotor, there is produced at the stator windings of the stator a voltage that is dependent on the speed of the sensor rotor and represents the sensor signal.

13. The expansion installation as claimed in claim 1, wherein, for the purpose of achieving the permanent magnetization, the sensor rotor has a magnet material comprising rare earth elements.

14. The expansion installation as claimed in claim 1, wherein the sensor generator is configured such that, at a speed of rotation of the generator that corresponds to a frequency of the generated AC voltage lying in the range of a grid frequency of a grid, it the sensor generator generates a voltage in the range between 30 V and 48 V.

15. The expansion installation as claimed in claim 1, wherein the expansion device has at least one expander screw, which is driven by the expanding working medium and drives the generator.

16. An installation configured to obtain electrical energy from waste heat, the installation comprising an expansion installation configured to operate in a thermodynamic circulation procedure, wherein the expansion installation takes a form as claimed in claim 1.

17. The installation as claimed in claim 16, wherein it has a controller, which controls a circuit of the circulation procedure and a power switch for connecting the generator to an electrical grid.

18. The installation as claimed in claim 17, wherein the controller detects the voltage generated by the sensor generator, determines therefrom a value of the speed of rotation of the generator and, by closing the power switch, connects the generator to the electrical grid when the speed of rotation of the generator gives an AC voltage of which a frequency of the generated AC voltage corresponds to a grid frequency of the electrical grid.

19. The installation as claimed in claim 18, wherein the controller monitors the speed of rotation of the generator that is coupled to the electrical grid and, if the frequency of the generated AC voltage deviates from the grid frequency, intervenes in the circuit in controlling manner, adapting the speed of the generator.

20. The installation as claimed in claim 18, wherein the controller monitors the speed of rotation of the generator that is coupled to the electrical grid and, if the difference between the frequency of the AC voltage generated by the generator and the grid frequency of the grid exceeds a threshold, isolates the generator from the electrical grid by opening the power switch.

21. The installation as claimed in claim 18, wherein the generator is coupled to the electrical grid by means of a converter unit.

22. The installation as claimed in claim 21, wherein the converter unit converts electrical energy that is generated by the generator at a generator frequency into electrical energy having the grid frequency of the electrical grid, and feeds the electrical energy to the electrical grid.

23. The installation as claimed in claim 22, wherein the converter unit converts the electrical energy of the generator into electrical energy for feeding to the electrical grid if the generator frequency lies in an operating frequency range that extends from a minimum frequency to a high frequency.

24. The installation as claimed in claim 23, wherein the converter unit is configured to predetermine the generator frequency of the generator.

25. The installation as claimed in claim 23, wherein the controller uncouples the generator from the converter unit if the generator frequency lies outside the operating frequency range.

26. The installation as claimed in claim 22, wherein the converter unit has a DC link circuit for generating electrical energy at the grid frequency.

27. The installation as claimed in claim 26, wherein the converter unit has a first converter, which is connectable to the generator, for feeding the DC link circuit.

28. The installation as claimed in claim 22, wherein, as a result of cooperation between the controller and the converter unit, the generator frequency is adaptable to an output released by the circulation procedure at the generator.

29. The installation as claimed in claim 17, wherein the controller, when the generator is connected to the electrical grid, connects stator windings of the generator to a capacitor set in parallel.

30. The installation as claimed in claim 29, wherein the controller, when the generator is isolated from the electrical grid, maintains the parallel connection of the stator windings to the capacitor set and in addition connects a resistor set to it in parallel.

31. The installation as claimed in claim 30, wherein the controller isolates the generator from the capacitor set and the resistor set for the purpose of generator start-up.

32. An expansion installation for obtaining electrical energy from heat by means of a thermodynamic circulation procedure, comprising an expansion device, which is operated by an expanding working medium of the thermodynamic circulation procedure, and a generator driven by the expansion device, the expansion installation is provided with a rotational speed sensor, which is coupled to a shaft of the expansion installation that rotates proportionally to a rotor of the generator, and which takes the form of an electrical sensor generator having a permanently magnetized sensor rotor and a stator that generates an electrical sensor signal, which electrical sensor generator generates as a sensor signal an electrical voltage;
　wherein the sensor generator is arranged in an overall casing of the expansion installation and is exposed therein to an organic working medium and a lubricant; and
　wherein the sensor generator is arranged in a generator casing and coupled to a generator shaft.

33. The expansion installation as claimed in claim 32, wherein the sensor rotor of the sensor generator is coupled to a shaft end of the generator shaft and carried by it.

34. An expansion installation for obtaining electrical energy from heat by means of a thermodynamic circulation procedure, the expansion installation comprising:
　an expansion device, which is operated by an expanding working medium of the thermodynamic circulation procedure, and a generator driven by the expansion device, the expansion installation is provided with a rotational speed sensor, which is coupled to a shaft of the expansion installation that rotates proportionally to a rotor of the generator, and which takes the form of an electrical sensor generator having a permanently magnetized sensor rotor and stator that generates an electrical sensor signal, which electrical sensor generator generates as a sensor signal an electrical voltage;
　wherein the sensor generator is arranged in an overall casing of the expansion installation and is exposed therein to an organic working medium and a lubricant; and
wherein the sensor generator is arranged in an expander casing of said overall casing and coupled to a screw shaft.

35. The expansion installation as claimed in claim 34, wherein the sensor generator has a permanently magnetized sensor rotor that cooperates with a stator having stator windings, wherein, during rotation of the sensor rotor, there is produced at the stator windings of the stator a voltage that is dependent on the speed of the sensor rotor and represents the sensor signal.

36. The expansion installation as claimed in claim 35, wherein the sensor generator is configured such that, at a speed of rotation of the generator that corresponds to a frequency of the generated AC voltage lying in the range of a grid frequency of a grid, the sensor generator generates a voltage in the range between 30 V and 48 V.

37. The expansion installation as claimed in claim 36, wherein the sensor rotor of the sensor generator is coupled directly and non-rotatably to a shaft end and is carried by it.

38. The expansion installation as claimed in claim 37, wherein the sensor rotor of the sensor generator is arranged on a rotor carrier that is connected to the shaft end.

39. An expansion installation for obtaining electrical energy from heat by means of a thermodynamic circulation procedure, comprising:
an expansion device, which is operated by an expanding working medium of the thermodynamic circulation procedure, and a generator driven by the expansion device, the expansion installation is provided with a rotational speed sensor, which is coupled to a shaft of the expansion installation that rotates proportionally to a rotor of the generator, and which takes the form of an electrical sensor generator having a permanently magnetized sensor rotor and stator that generates an electrical sensor signal, which electrical sensor generator generates as a sensor signal an electrical voltage;
wherein the sensor generator is arranged in an overall casing of the expansion installation and is exposed therein to an organic working medium and a lubricant; and
wherein the sensor generator is arranged in a generator casing of said overall casing and coupled to a generator shaft.

40. The expansion installation as claimed in claim 39, wherein the sensor generator has a permanently magnetized sensor rotor that cooperates with a stator having stator windings, wherein, during rotation of the sensor rotor, there is produced at the stator windings of the stator a voltage that is dependent on the speed of the sensor rotor and represents the sensor signal.

41. The expansion installation as claimed in claim 40, wherein the sensor generator is configured such that, at a speed of rotation of the generator that corresponds to a frequency of the generated AC voltage lying in the range of a grid frequency of a grid, the sensor generator generates a voltage in the range between 30 V and 48 V.

42. The expansion installation as claimed in claim 41, wherein the sensor rotor of the sensor generator is coupled directly and non-rotatably to a shaft end and is carried by it.

43. The expansion installation as claimed in claim 42, wherein the sensor rotor of the sensor generator is arranged on a rotor carrier that is connected to the shaft end.

* * * * *

UNITED STATES PATENT AND TRADEMARK OFFICE
CERTIFICATE OF CORRECTION

PATENT NO. : 12,228,040 B2
APPLICATION NO. : 17/392476
DATED : February 18, 2025
INVENTOR(S) : Franck Repentin et al.

Page 1 of 1

It is certified that error appears in the above-identified patent and that said Letters Patent is hereby corrected as shown below:

In the Claims

Column 19, Line 1 Claim 14 reads, "a grid frequency of a grid, it the sensor generator generates..."
Should read --a grid frequency of a grid, the sensor generator generates...--

Signed and Sealed this
Third Day of June, 2025

Coke Morgan Stewart
*Acting Director of the United States Patent and Trademark Office*